2,964,848

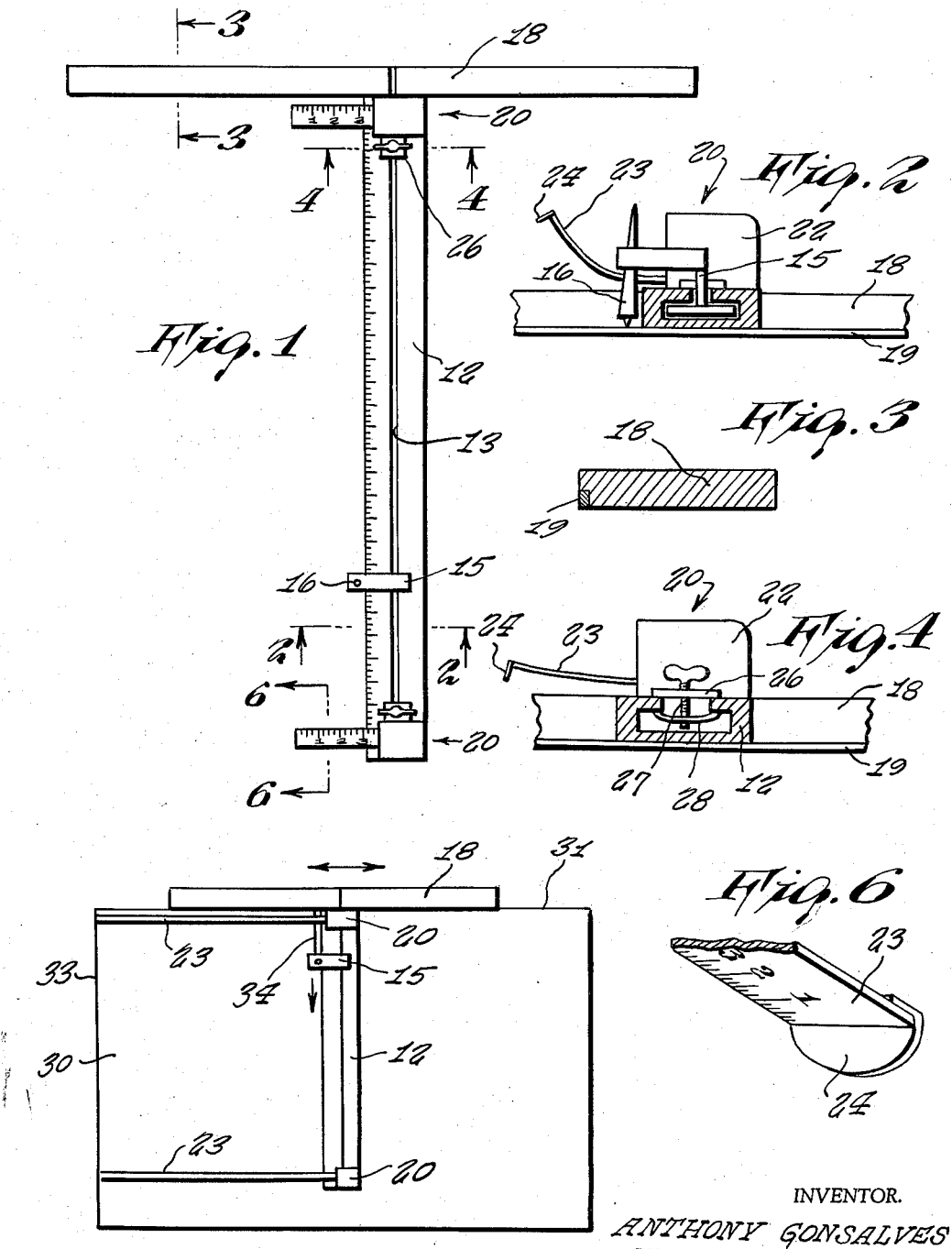

PORTABLE GLASS CUTTING MACHINE

Anthony Gonsalves, Valley Stream, N.Y.
(146—44 58th Road, Flushing, N.Y.)

Filed Feb. 18, 1958, Ser. No. 715,903

1 Claim. (Cl. 33—32)

This invention relates to machine tools and more particularly to a portable glass cutting unit.

While various types of glass cutting machines have been provided, most of these machines are of substantially large size and require permanent installations. It thus makes it difficult to cut glass at the location in which it is to be installed, thereby requiring all glass to be precut at the shop before being taken to the installation site. This procedure has been found to have various disadvantages, as well as being extremely inconvenient in many cases. It is therefore an object of the present invention to provide a portable glass cutting machine that is simple in construction, efficient in operation, and which may be carried from place to place so as to overcome the aforementioned difficulties.

Another object of the present invention is to provide a portable glass cutting machine having self contained squaring and measuring devices for precisely aligning the cutting tool, and a fixed groove for guiding the cutting tool during movement across the panel being cut.

Still another object of the present invention is to provide a portable glass cutting machine of the type described that can cut substantially any size panel on a flat surface without the necessity of having to attach the machine to a stationary wall.

All of the foregoing and still further objects and advantages of this invention will become apparent from a study of the following specification, taken in connection with the accompanying drawing, wherein:

Figure 1 is a top plan view of a glass cutting machine made in accordance with the present invention;

Figure 2 is an enlarged transverse cross-sectional view taken along line 2—2 of Figure 1;

Figure 3 is an enlarged transverse cross-sectional view taken along line 3—3 of Figure 1;

Figure 4 is an enlarged transverse cross-sectional view taken along line 4—4 of Figure 1;

Figure 5 is a top plan view of the machine shown in Figure 1 in operative use; and Figure 6 is a perspective cross-sectional view taken along line 6—6 of Figure 1.

Referring now to the drawing, and more particularly to Figures 1 to 4 thereof, a glass cutting machine 10 made in accordance with the present invention is shown to include a main body member 12 which has a substantially uniform slot 13 extending the entire length thereof and continuously across the cross head 18 of the assembly, such slot being of T-shaped cross-section so as to slidably receive a similarly shaped base 15 which slidably supports a conventional hand glass cutter 16, such as by ball bearings (not shown), for longitudinal movement along the main body member 12.

The cross head 18 which extends perpendicular to the longitudinal axis of the main body member 12 is secured to one end thereof for sliding engagement along one edge of the glass panel to be cut. An insert 19 slidably engages the edge of the panel while the remaining portion of the cross head 18 and main body member 12 are slidably supported upon the upper surface thereof. A pair of flexible tape measure units 20 are also slidably supported upon the main body member 12 for adjustable longitudinal movement relative thereto.

As is more clearly shown in Figures 1 and 4, each tape measure unit 20 includes a housing 22 within which a flexible tape 23 is rolled for selective extension and retraction relative thereto. Each housing 22 has an integral plate 26 that overlies the slot 13 and rotatably supports a thumb screw 27. This thumb screw threadingly engages a washer 28 that is disposed within the slot 13 in opposing relationship with the plate 26, whereby tightening of the thumb screw 27 is operative to clamp the slot defining portions of the main base member 12 between the plate 26 and the washer 28 so as to secure the tape unit in any desired longitudinal position. The outer end of each flexible tape is provided with a downwardly depending tab 24 for engaging the edge of the glass panel parallel to the edge being cut.

In actual use, the unit is placed upon the upper surface of the glass panel 30 with the cross head 18 in sliding engagement with one side edge 31 of the panel. The tape measure units 20 are positioned at any desired point along the length of the main base member 12 and the flexible tapes are used to measure the exact distance from the opposite edge 33 of the panel from the edge 34 being cut along the scribe line, following which they are moved as far out of the way as possible, one being adapted to be supported within the continued slot in the cross head. With the glass cutter 16 in engagement with the panel 30, the base 15 is drawn longitudinally along the base member 12, with the proper amount of pressure thereon, depending upon the sharpness of the cutter wheel, to inscribe the break line 34.

If desired, the base 15 may be constructed from a flexible spring-like material to provide a variable spring action for controlling the pressure on the cutter 16. Because of the manner in which the cross head 18 and flexible tapes 23 are used to position the main base member 12, a perfectly square scribe line may be had at all times.

While this invention has been described with particular reference to the construction shown in the drawing, it is to be understood that such is not to be construed as imparting limitations upon the invention, which is best defined by the claim appended hereto.

What I claim as new and desire to protect by Letters Patent of the United States is:

A portable glass cutting machine including the combination of an elongated longitudinal base member adapted to be positioned upon a glass panel to be cut, a cross head extending at right angles to the base member and rigidly secured at an intermediate portion thereof to one end of said base member, the base member and the cross head having an upwardly open undercut inverted T-shaped longitudinal slot extending along the entire length of the base member and continuing across the cross head, a glass cutter support member slidably mounted upon the base member in guided engagement with the longitudinal slot and having a cutter disposed at one side of said base member, said support member comprising a slide of inverted T-shape profile slidably fitting in said slot and extending upward therefrom over said slot and carrying said cutter, and at least one tape measure housing slidably mounted upon said base member with a portion thereof extending into said slot in guided engagement therewith, said tape measure housing being mounted transversely of said base member and the slot therein and having an extensible tape measure adapted for extension in parallelism with said cross head and terminating in a depending tab forming a stop for engaging with the edge of the glass panel to be cut.

References Cited in the file of this patent

UNITED STATES PATENTS

| | | |
|---|---|---|
| 507,395 | Walsh | Oct. 24, 1893 |
| 1,100,878 | Higgins et al. | June 23, 1914 |
| 1,286,312 | Hertle | Dec. 3, 1918 |
| 2,571,569 | Greenwood | Oct. 16, 1951 |

FOREIGN PATENTS

| | | |
|---|---|---|
| 412,660 | France | May 7, 1910 |